United States Patent [19]
Miyashita

[11] Patent Number: 5,857,145
[45] Date of Patent: Jan. 5, 1999

[54] RADIO PAGER

[75] Inventor: Yukio Miyashita, Shizuoka, Japan

[73] Assignee: NEC Corporation, Tokyo, Japan

[21] Appl. No.: 904,815

[22] Filed: Aug. 1, 1997

[30] Foreign Application Priority Data

Aug. 2, 1996 [JP] Japan ................................. 8-205016

[51] Int. Cl.$^6$ .................................................. H04B 7/00
[52] U.S. Cl. ........................................ 455/38.1; 455/38.3
[58] Field of Search ................................. 455/38.1, 254,
455/525, 193.1, 280, 38.3, 31.1, 232.1

[56] References Cited

U.S. PATENT DOCUMENTS

| | | | |
|---|---|---|---|
| 4,792,984 | 12/1988 | Matsuo | 455/38.1 |
| 5,303,411 | 4/1994 | Stengel et al. | 455/254 |
| 5,390,362 | 2/1995 | Mojeska et al. | 455/38.1 |
| 5,572,516 | 11/1996 | Miya et al. | 455/38.1 |
| 5,574,439 | 11/1996 | Miyashita | 455/38.1 |
| 5,636,243 | 6/1997 | Tanaka | 455/38.3 |
| 5,652,748 | 7/1997 | Jolma et al. | 455/38.1 |
| 5,677,681 | 10/1997 | Tanaka et al. | 455/38.1 |
| 5,722,060 | 2/1998 | Horigume | 455/254 |

FOREIGN PATENT DOCUMENTS 327631  2/1991  Japan .

*Primary Examiner*—Reinhard J. Eisenzopf
*Assistant Examiner*—Edan Orgad
*Attorney, Agent, or Firm*—Sughrue, Mion, Zinn, Macpeak & Seas, PLLC

[57] ABSTRACT

A radio pager of the present invention is capable of determining, during automatic area switching operation, a frequency having a high field strength by excluding the other frequencies having low field strengths. In addition, the pager is capable of determining such a frequency simply at low cost by use of its original antenna and radio frequency gain control function, i.e., without resorting to any additional circuitry.

3 Claims, 5 Drawing Sheets

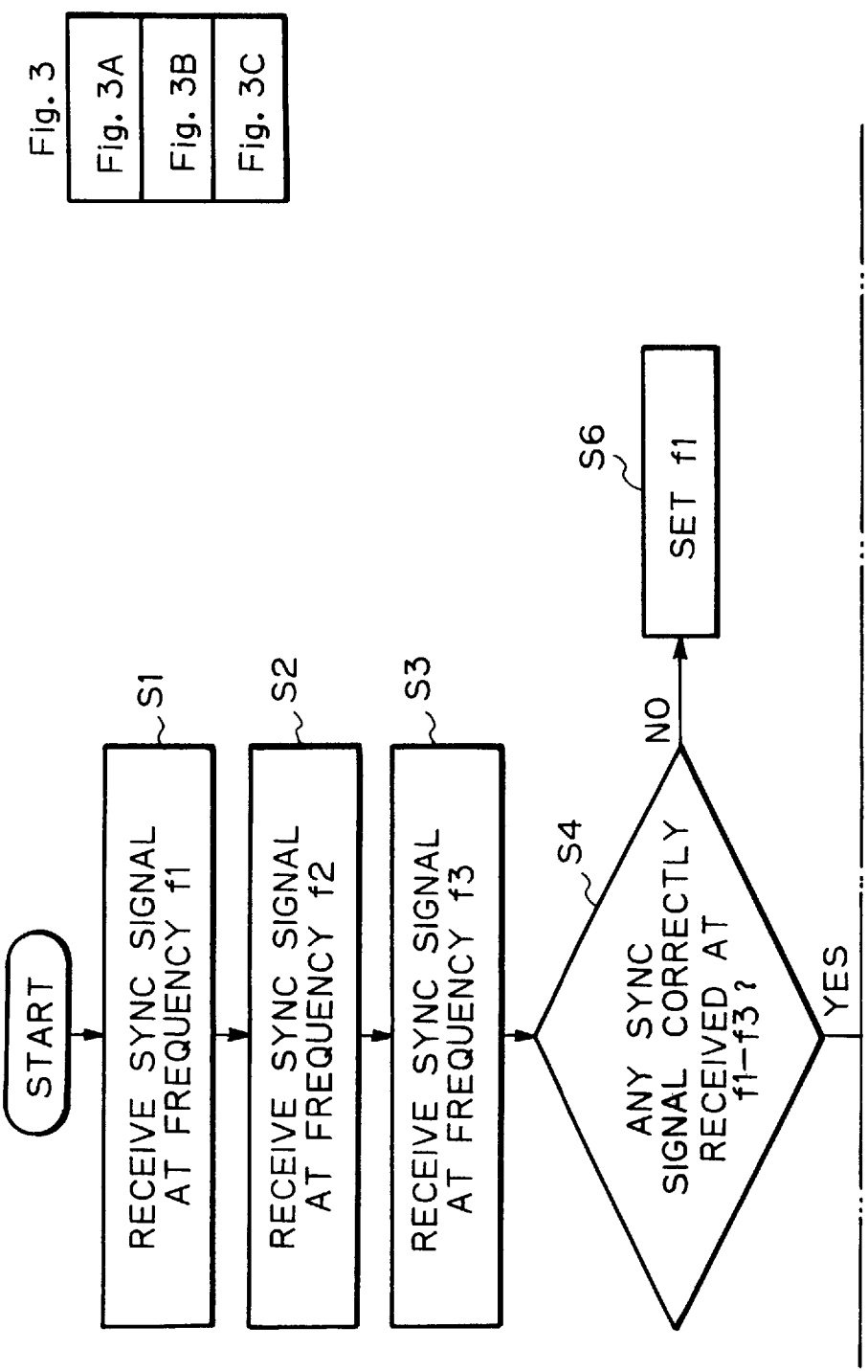

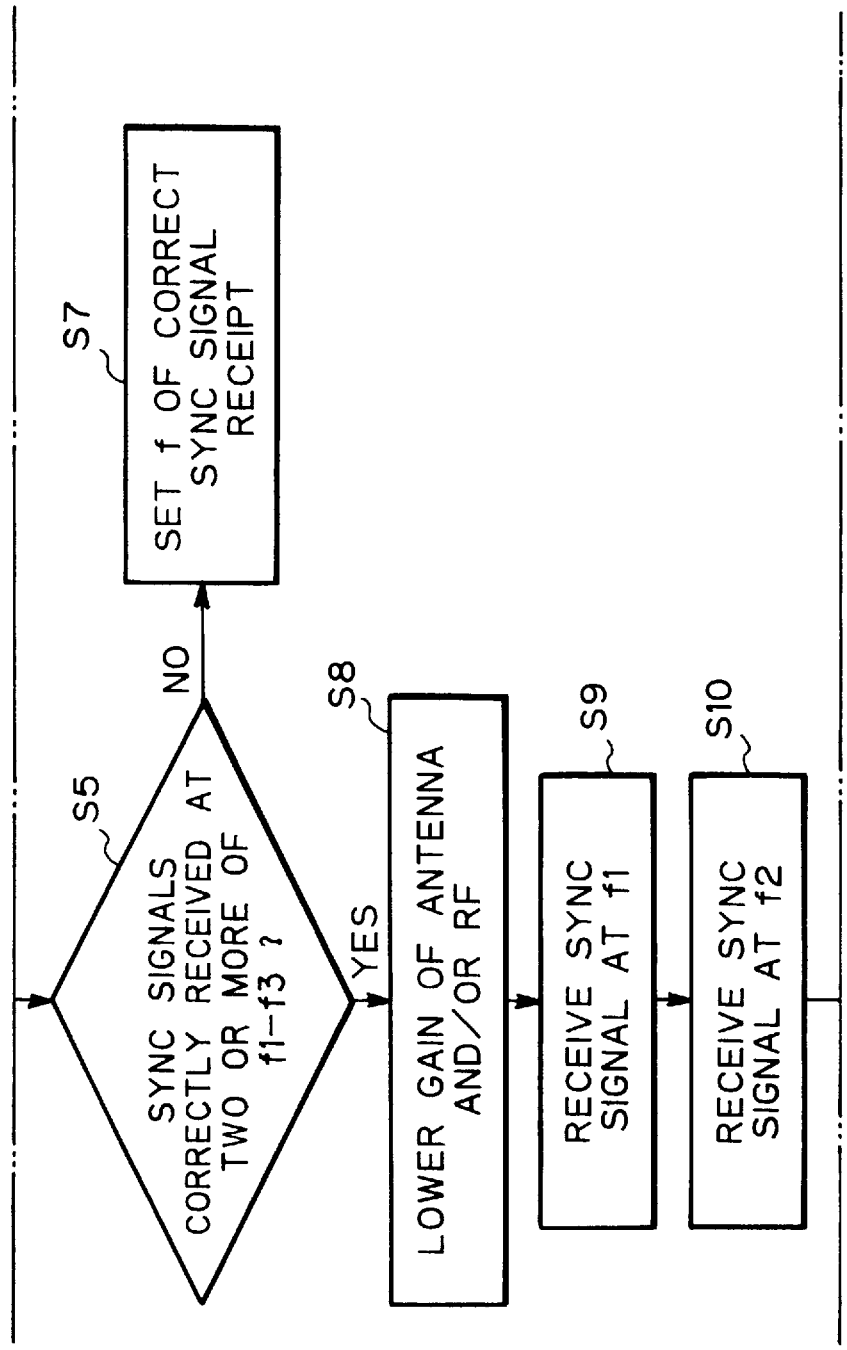

RADIO PAGER

BACKGROUND OF THE INVENTION

The present invention relates to a radio pager and, more particularly, to a radio pager having an automatic area switching capability.

Two kinds of automatic area switching schemes are available with a radio pager having the above capability. A first scheme is to sequentially switch a receipt frequency and set up a frequency at which a synchronizing signal has been received first. A second scheme is to sequentially switch a receipt frequency in order to detect a receipt field strength, and set up a frequency at which a synchronizing signal has been received with a field strength above a preselected value. Japanese Patent Laid-Open Publication No. 3-27631 teaches a third scheme consisting in comparing a received and digitized signal and its regular timing waveform, counting the points of regular transition of the signal in order to determine a frequency at which the field strength is highest, and then setting up such a frequency. The first to third conventional schemes have the following problems left unsolved.

With the first scheme, it is likely that area switching is set at a receipt frequency whose electric strength is low. As a result, automatic area switching must be repeated frequently. This reduces the life of a battery mounted on the radio pager and is apt to omit an incoming call during area switching. This problem stems from the fact that the area switching of the radio pager usually occurs in a region where different service areas overlap each other, i.e., a plurality of frequency signals which the radio pager can receive exist together. With the second scheme, it is difficult to detect electric fields because automatic area switching usually occurs at the peripheral region of a service area where only frequency signals of low field strengths are available. Further, the third scheme is not practicable without resorting to an additional circuit for detecting electric fields, obstructing the miniaturization of the radio pager.

SUMMARY OF THE INVENTION

It is therefore an object of the present invention to provide a radio pager capable of finding, out of a plurality of frequencies, a frequency having a high field strength during automatic area switching operation.

It is another object of the present invention to provide a low cost radio pager capable of setting the frequency having a great electric field strength easily by use of its original gain control function, i.e., without resorting to any additional circuit.

A radio pager capable of receiving a call in each of at least two service areas at a particular radio frequency of the present invention includes an antenna for receiving a signal having the radio frequency. A radio frequency (RF) section receives and demodulates, one at a time, a plurality of signals input from the antenna and each having a particular radio frequency. A channel controller varies the receipt frequency of the antenna or that of the RF section, depending on whether or not a synchronizing signal included in the demodulated signal is received. A gain controller lowers, when synchronizing signals are correctly received over a plurality of channels, the gain of the antenna or that of the RF section to thereby lower a receipt sensitivity. A controller controls the channel controller and gain controller in order to determine a receipt frequency having the high field strength.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Figure 1:
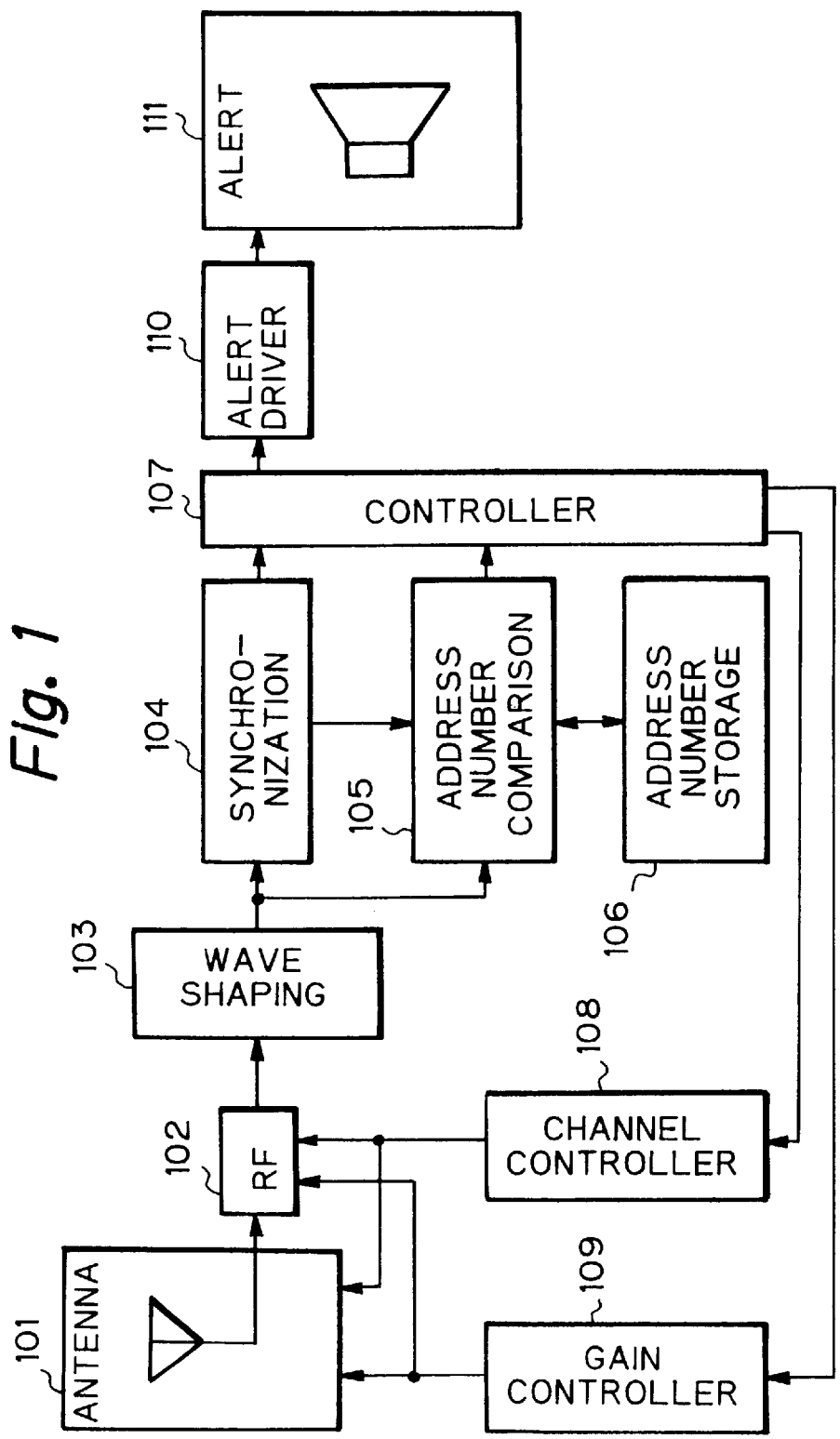
FIG. 1 is a block diagram schematically showing a radio pager embodying the present invention.

Referring to FIG. 1 of the drawings, a radio pager embodying the present invention is shown. As shown, the radio pager includes an antenna 101. An RF 102 amplifies and demodulates a radio frequency signal coming in through the antenna 101. A wave shaping 103 shapes the waveform of the demodulated signal and thereby outputs, e.g., an NRZ (Non-Return-to-Zero) signal. A synchronization 104 sets up synchronization based on a synchronizing signal included in the demodulated signal, and feeds a timing signal to an address number comparison 105. An address number storage 106 stores an address number assigned to the radio pager. A controller 107 controls, depending on whether or not the synchronizing signal is received, a channel controller 108 so as to vary the receipt frequency (channel) of the antenna 101 and IF 102. A gain controller 109 controls one or both of the gain of the antenna 101 and that of the RF 102 under the control of the controller 107. An alert driver 110 drives an alert 111 including, e.g., a speaker.

In operation, a radio frequency signal coming in through the antenna 101 is efficiently fed to the RF 102. The RF 102 amplifies the radio frequency signal, demodulates the amplified signal, and then feeds the demodulated signal to the wave shaping 103. The wave shaping 103 shapes the waveform of the demodulated signal and applies the resulting signal to the synchronization 104 and address number comparison 105. The synchronization 104 delivers to the address number comparison 105 a timing signal based on the synchronizing signal included in the demodulated signal. At the same time, the synchronization 105 reports to the controller 107 whether or not a synchronizing signal has been received. The address number comparison 105 determines an address number also included in the demodulated signal in response to the timing signal input from the synchronization 104. The comparison 105 compares the address number of the demodulated signal with the address number written to the address number storage 106 beforehand. Then, the comparison 105 reports to the controller 107 the presence/absence of an incoming call on the basis of the result of comparison. If a synchronizing signal has been received and if an incoming call is present, the controller 107 causes the alert driver 110 to drive the alert 111. As a result, the speaker, for example, produces an audible tone so as to alert the user of the radio pager to the call.

When the radio pager is in its automatic area switching mode operation, the controller 107 memorizes whether or not a synchronizing signal, among others, is present, causes the channel controller 108 to vary the receipt frequency of the antenna 101 and RF 102, again determines whether or not a synchronizing signal is present, and then memorizes the result of the decision. After the receipt of synchronizing signals over all the channels registered at the radio pager, the controller 107 counts the channels over which synchronizing signals have been correctly received. If synchronizing signals have been correctly received over a plurality of channels, the controller 107 causes the gain controller 109 to lower one or both of the gain of the antenna 101 and that of the RF 102, i.e., the receipt sensitivity of the radio pager. Then, the controller 107 again determines whether or not a synchronizing signal or signals are received. Consequently, among frequency signals which can be received by the radio pager and each having a particular field strength, the frequency signals whose field strengths are low become unable to be received by the radio pager. This allows the controller 107 to determine the remaining frequency signal having a high field strength.

Figure 2:
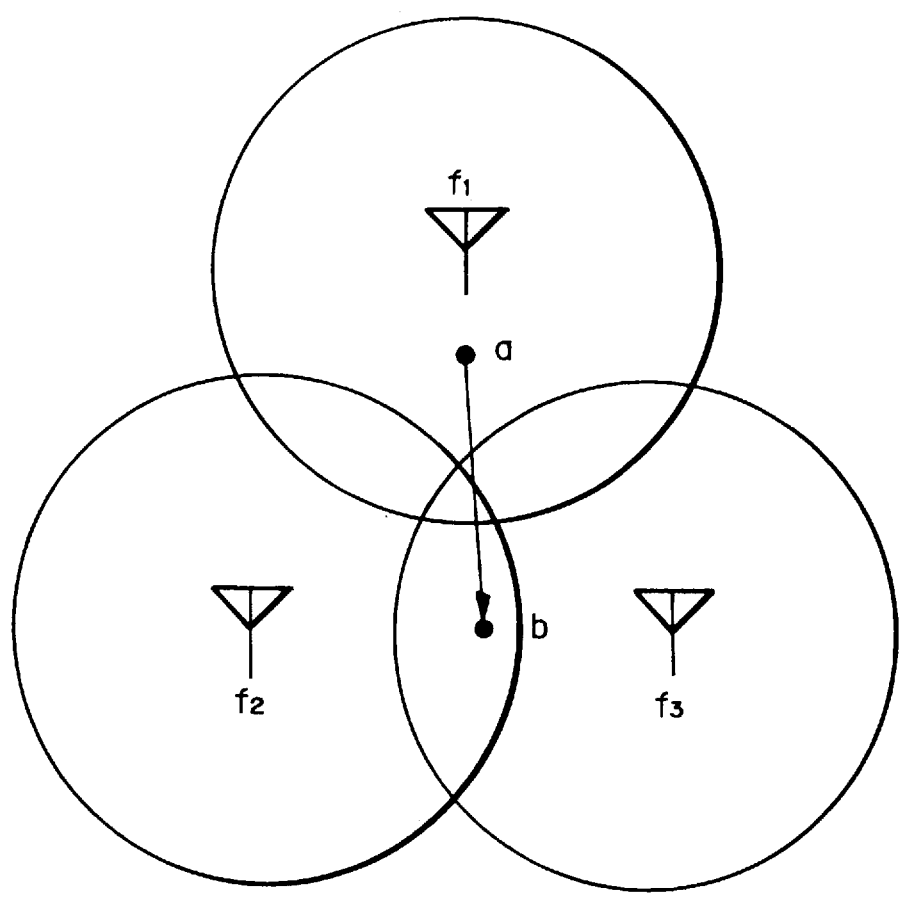
FIG. 2 shows specific service areas in each of which the radio pager of FIG. 1 may be called by a particular frequency.
Figure 3C:
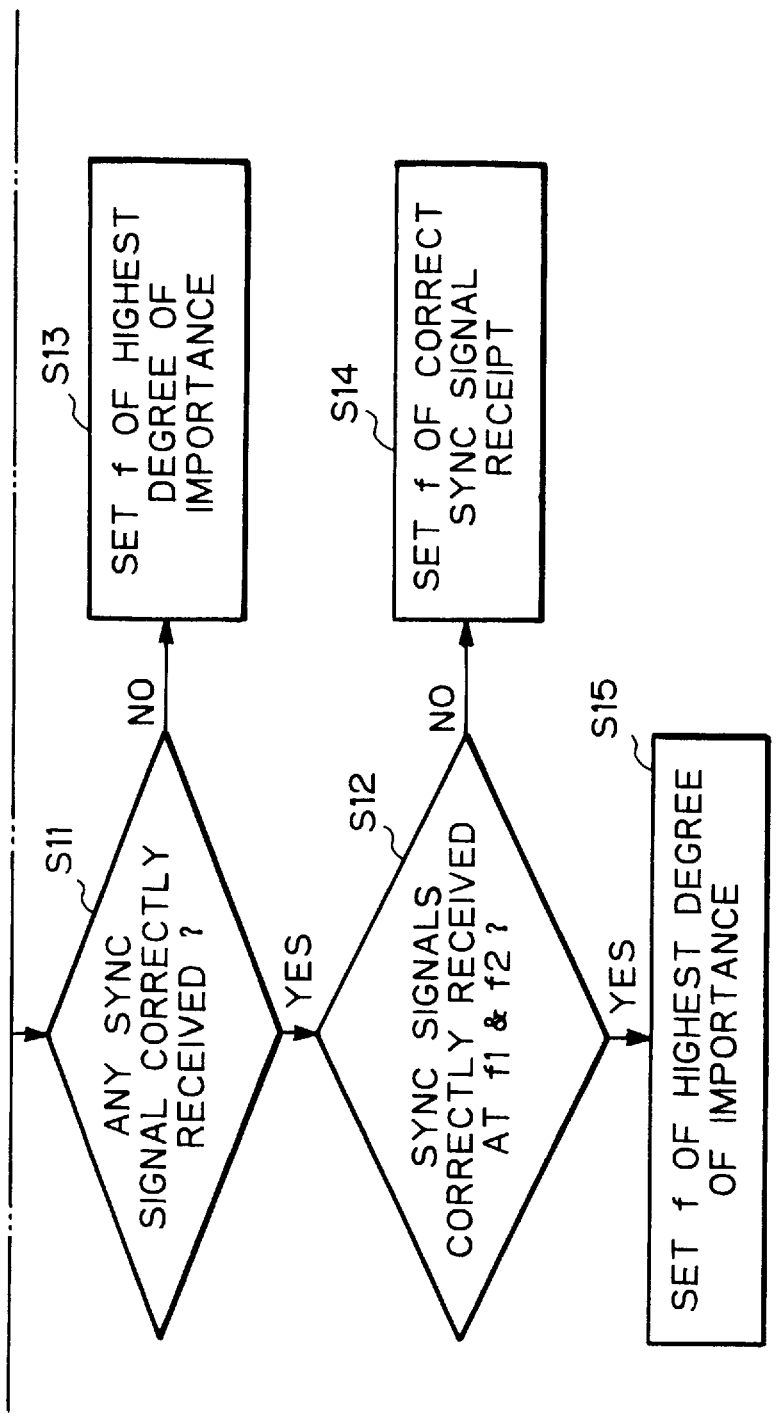
FIG. 3 is a flowchart demonstrating a specific automatic area switching routine available with the embodiment.

Reference will be made to FIGS. 2 and 3 for describing a specific automatic area switching routine available with the illustrative embodiment. FIG. 2 shows three adjoining service areas by way of example. Assume that the radio pager having the configuration of FIG. 1 moves from a point a to a point b shown in FIG. 2, and that three different frequencies f1, f2 and f3 are respectively assigned to the three service areas. In the illustrative embodiment, priority is given in the order of the frequencies f1, f2 and f3 and representative of the degree of importance, i.e., the area in which the radio pager is most likely to exist. As shown in FIG. 3, the controller 107 causes the radio pager to receive synchronizing signals in the order of the frequencies f1, f2 and f3 (registered order) (steps S1, S2 and S3). Then, the controller 107 counts the frequencies at which synchronizing signals have been correctly received (steps S4 and S5). If the number of such frequencies is zero (NO, step S4), the controller 107 sets up the same frequency as before the automatic area switching mode operation (f1 in this case) and ends the switching operation (step S6). If a synchronizing signal is correctly received at only one frequency (NO, step S5; the frequency may be f2 or f3 at the point b), the controller 107 sets up the one frequency and ends the switching operation (step S7).

If synchronizing signals are correctly received at two frequencies, i.e., f2 and f3 (YES, step S5), the controller 107 causes the channel controller 108 to lower the gain of the antenna 101 and/or the gain of the RF 102, i.e., the receipt sensitivity of the radio pager (step S8). Then, the controller 107 causes the radio pager to sequentially receive synchronizing signals at the frequencies f2 and f3 in this order (steps S9 and S10), and again counts the frequencies at which synchronizing signals have been correctly received (steps S11 and S12). If the number of such frequencies is zero (NO, step S11), the controller 107 sets up the frequency having the higher degree of importance (step S13) and ends the switching operation. If the number of the above frequencies is one, the controller 107 sets up the frequency at which a synchronizing signal has been received (f2 of f3), and ends the switching operation (step S14). Further, if synchronizing signals have been received at two frequencies (YES, step S12), the controller 107 selects one of them having a higher degree of importance than the other and ends the switching operation (step S15). Whether or not to lower both the gain of the antenna 101 and that of the RF 102 is open to choice. The crux is to lower the receipt sensitivity of the radio pager.

In summary, it will be seen that the present invention provides a radio pager having various unprecedented advantages, as enumerated below.

(1) The radio pager can determine a frequency having a high field strength by excluding the other frequencies having low field strengths. In addition, the pager can determine such a frequency simply at low cost by use of its original antenna and RF gain control function, i.e., without resorting to any additional circuitry.

(2) The pager can set up a frequency of optimal field strength in accordance with the number of channels over which synchronizing signals have been correctly received.

(3) The pager can set up the frequency of optimal field strength in accordance with the above number of channels and in the order of the degree of importance.

Various modifications will become possible for those skilled in the art after receiving the teachings of the present disclosure without departing from the scope thereof.

What is claimed is:

1. A radio pager having an automatic area switching operation mode for receiving a call in a plurality of service areas at a particular radio frequency, said radio pager comprising:

an antenna for receiving a signal transmitted at the radio frequency;

an RF section for receiving and demodulating, one at a time, a plurality of signals input from said antenna and each having a particular radio frequency;

a channel controller for varying a receipt frequency of said antenna or a receipt frequency of said RF section, depending on whether or not a synchronizing signal included in the signal demodulated is received;

a gain controller for decreasing reception sensitivity by decreasing the gain of said antenna or the gain of said RF section when synchronizing signals are correctly received over a plurality of channels; and a controller for controlling said channel controller and said gain controller in order to determine a reception frequency having a highest field strength.

2. A radio pager as claimed in claim 1, wherein said controller restores an original reception frequency when a number of channels over which the synchronizing signals are correctly received is zero, sets up a channel over which the synchronizing signal is correctly as a current reception frequency when said number of channels over which the synchronizing signals are correctly received is one, and controls said gain controller to lower the gain of said antenna or the gain of said RF section, and again sequentially switches the reception frequency in order to determine the number of channels over which the synchronizing signals are correctly received when said number of channels over which the synchronizing signals are correctly received is greater than one.

3. A radio pager as claimed in claim 1, wherein said controller restores an original reception frequency when a number of channels over which the synchronizing signals are correctly received is zero, sets up a channel over which the synchronizing signal is correctly received as a current reception frequency when said number of channels over which the synchronizing signals are correctly received is one, and sets up a reception frequency having a highest degree of importance in accordance with a preselected priority order when said number of channels over which the synchronizing signals are correctly received is greater than one.

* * * * *